US005308038A

United States Patent [19]

McArthur

[11] Patent Number: 5,308,038

[45] Date of Patent: May 3, 1994

[54] USING THE STATOR TO PREVENT VALVE SEAT TURNING

[75] Inventor: Robert A. McArthur, Waterford, Mich.

[73] Assignee: Siemens Automotive L.P., Auburn Hills, Mich.

[21] Appl. No.: 116,237

[22] Filed: Sep. 2, 1993

[51] Int. Cl.[5] ........................ F16K 31/06; F02M 51/06

[52] U.S. Cl. ................................ 251/129.14; 251/901; 239/585.2; 239/900; 123/456; 123/470

[58] Field of Search ................... 251/129.14; 137/901; 239/585.2, 900; 123/470, 456

[56] References Cited

U.S. PATENT DOCUMENTS 4,390.130 6/1983 Linssen et al. ............. 251/129.14 X
5,197,675 3/1993 Daly ........................... 251/129.14 X

*Primary Examiner*—Arnold Rosenthal
*Attorney, Agent, or Firm*—George L. Boller; Russel C. Wells

[57] ABSTRACT

Keys on legs of a U-shaped stator are in keyed engagement with keyways on diametrically opposite sides of the O.D. of the sidewall of a valve seat member to axially and circumferentially locate the seat member.

6 Claims, 2 Drawing Sheets

USING THE STATOR TO PREVENT VALVE SEAT TURNING

FIELD OF THE INVENTION

This invention relates to electromagnetically operated valves such as fuel injectors.

BACKGROUND AND SUMMARY OF THE INVENTION

A fundamentally different type of fuel injector is disclosed in commonly assigned U.S. Pat. Nos. 5,178,115 and 5,197,675 of Paul D. Daly. The present invention relates to an improvement that associates the stator with the valve seat member in a manner that accurately locates the valve seat member, both axially and circumferentially, to an intended position in its mounting, and that assures that such location is maintained. In this way, any tendency of the valve seat member to turn within its mounting is avoided, and this can be helpful in assuring that the fuel injector remains properly calibrated during its useful life. The invention can also be helpful during the fabrication of a fuel injector by serving to locate component parts.

Further features, advantages, and benefits of the invention, along with those already mentioned, will be seen in the ensuing description and claims, which are accompanied by drawings. The drawings disclose a presently preferred embodiment of the invention according to the best mode contemplated at the present time for carrying out the invention.

DESCRIPTION OF THE PREFERRED EMBODIMENT

FIGS. 1-4 disclose a fuel rail assembly 18 containing several fuel injectors 20 pursuant to the present invention. The fuel injectors are disposed on a carrier 22 that fits within a circular cylindrical walled tube 24, and there are three fuel injectors for this particular example.

Figures 1, 2:
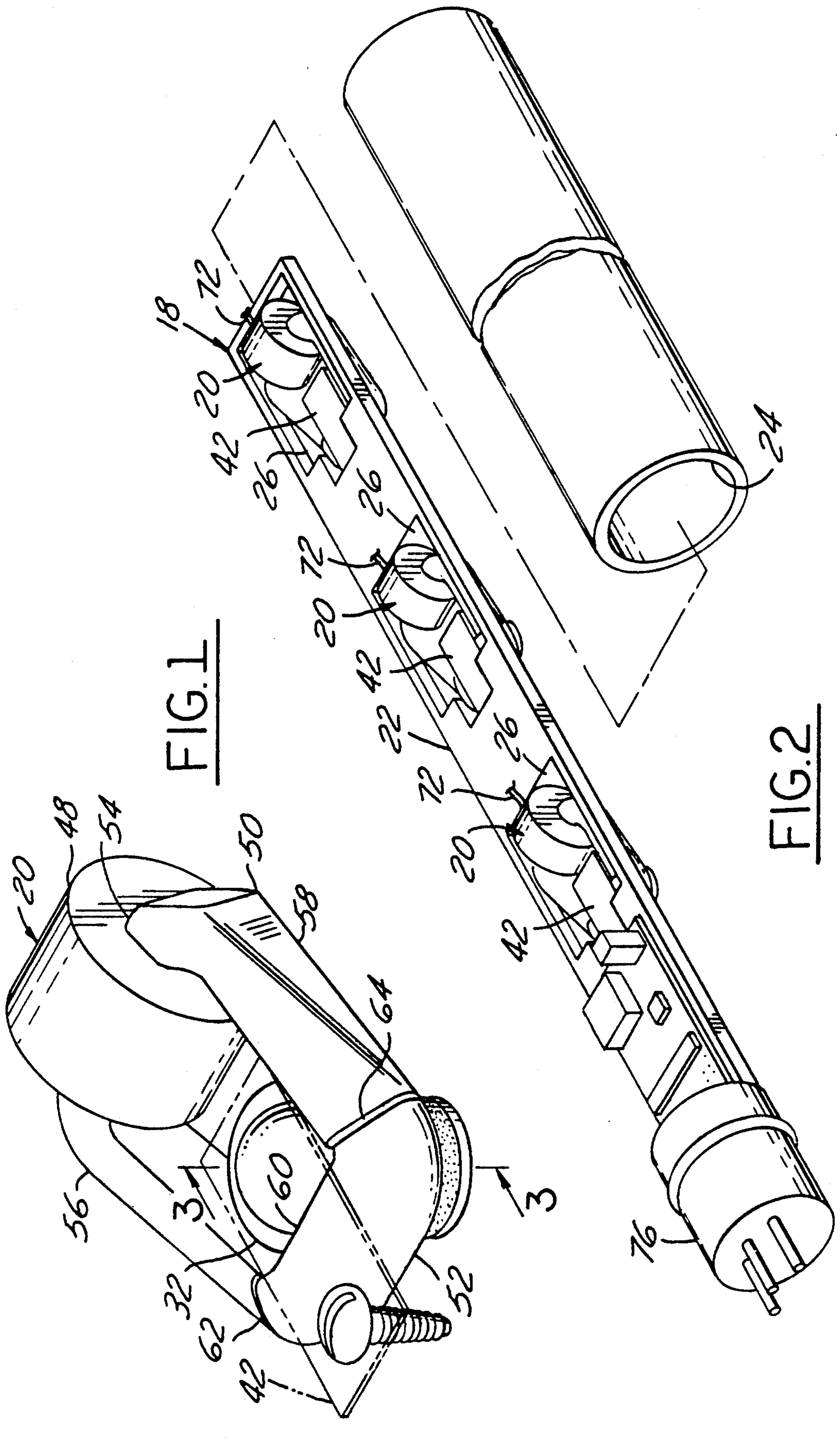
FIG. 1 is a perspective view illustrating the general organization and arrangement of a fuel injector embodying principles of the invention.
FIG. 2 is an exploded perspective view of certain portions of a fuel rail assembly that embodies fuel injectors like that of FIG. 1.
Figure 3:
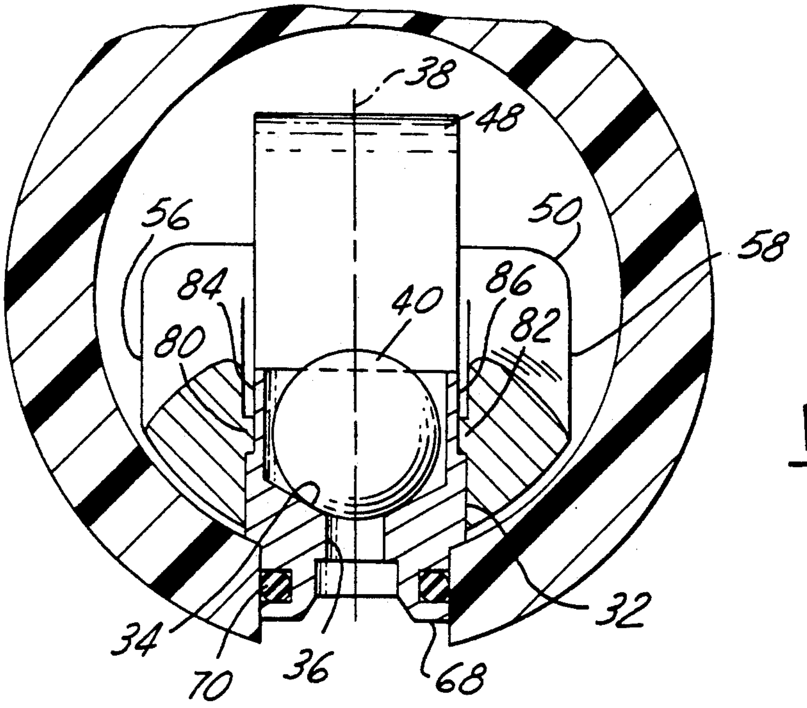
FIG. 3 is a transverse cross sectional view through the fuel injector of FIG. 1 in the direction of arrows 3—3.
Figure 4:
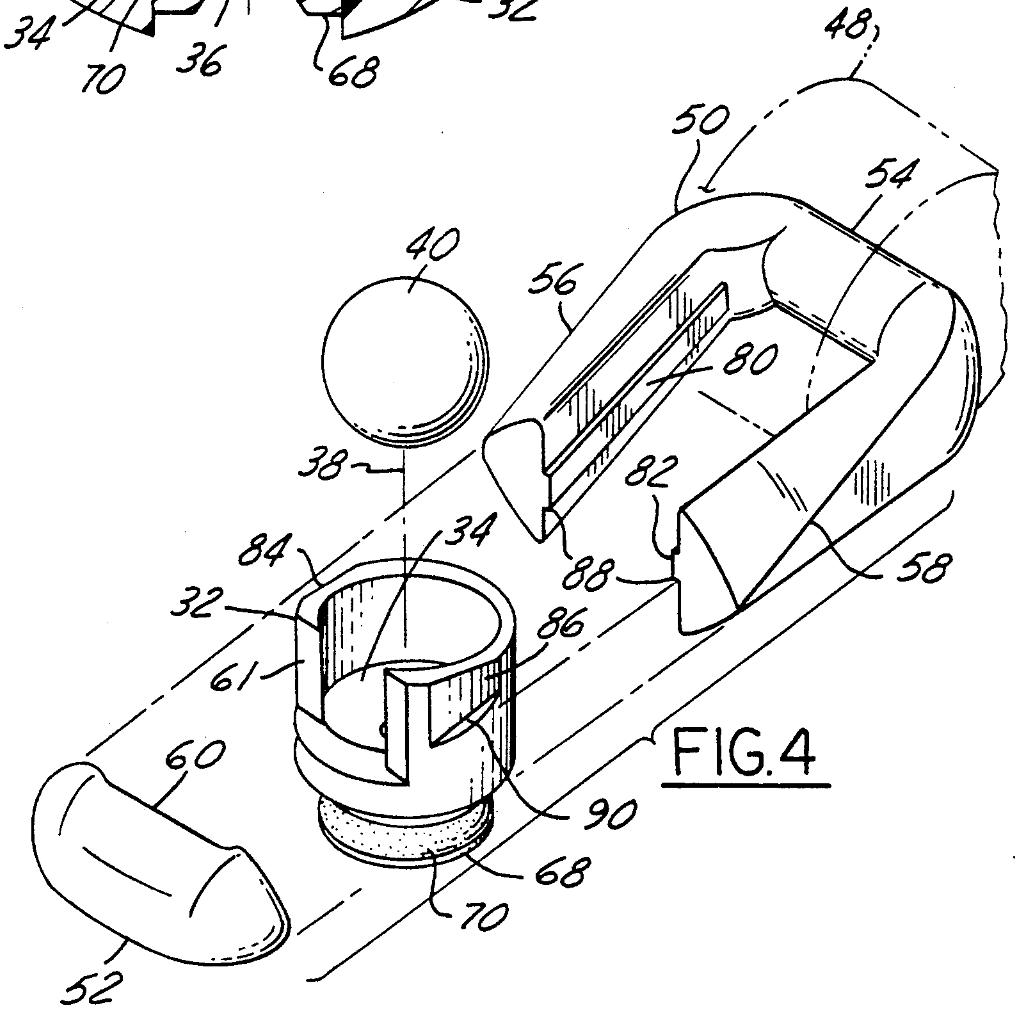
FIG. 4 is an exploded perspective view of the fuel injector of FIG. 1.

For each fuel injector 20, carrier 22 comprises a somewhat rectangular-shaped well 26. Each fuel injector comprises a seat member 32 that has a frusto-conical seat 34 that funnels to a hole 36. Seat 34 and hole 36 share a co-axis 38. A sphere 40 is seated on seat 34, and FIG. 1 shows the sphere concentric with axis 38 in closure of hole 36. The sphere is resiliently urged to such concentricity by an overlying flat spring blade 42 which is cantilever-mounted on carrier 22 aside seat member 32. FIG. 1 shows blade 42 to be essentially parallel with the carrier. The spring exerts a pre-load force on sphere 40 when the sphere is concentric with axis 38.

The fuel injector has a magnetic circuit that encircles sphere 40 and is composed of a solenoid coil 48, a stator 50, and an armature 52. The magnetic circuit may be considered to have a generally four-sided rectangular shape for fitting into well 26. Coil 48 and armature 52 form two opposite sides while the remaining two sides, which are opposite each other, are formed by portions of stator 50. Stator 50 is generally U-shaped, comprising a base 54 that passes through coil 48 and parallel legs 56, 58 that extend from base 54 to form two opposite sides of the magnetic circuit. Armature 52 is in the form of a bar that is disposed along side sphere 40 and operated by the magnetic circuit to act on the sphere at essentially the midpoint of the bar indicated by the reference numeral 60. Seat member 32 contains a suitably shaped notch 61 that allows the armature to act on the sphere. In the condition portrayed in FIG. 1, which is for the solenoid coil not energized, the opposite ends of the bar are spaced from the distal ends of legs 56, 58 by generally equal working gaps 62, 64, and the midpoint of the armature is in contact with the sphere at the end of a particular radial of the sphere. When the solenoid coil is energized, the magnetic flux that is generated in the magnetic circuit operates to reduce working gaps 62, 64 by attracting armature 52 toward the ends of the stator's legs 56, 58. This causes armature 52 to be moved bodily predominantly along the direction of an imaginary line that intersects axis 38 and that when viewed along axis 38 is essentially coincident with the radius of the sphere whose end is contacted by the midpoint of the armature. The cooperative effect of the motion of armature 52, of the resilience of spring blade 42, and of the angle of seat 34 is such that the sphere is moved from concentricity with axis 38 to eccentricity with axis 38 with the result that hole 36 opens. Sphere 40 is actually caused to roll slightly up seat 34. When energization of the solenoid coil terminates, the magnetic attractive force that stator 50 had been exerting on the armature ceases, and this enables the resiliency of spring blade 42 to return the sphere to concentricity with axis 38 and resulting closure of hole 36.

Hole 36 is surrounded by the tip end, or nozzle, 68 of the fuel injector at which fuel is injected into the engine. An O-ring seal 70 is seated in a groove extending around the sidewall of the injector tip end for sealing to a hole in tube 24 that receives nozzle 68. Electric lead wires 72 from the injectors extend to a connector 76 at the near end of the carrier. The solenoid coils, stators, and seat members are secured within the carrier wells by any suitable means of securement, and a cover (not shown) containing suitable windows each providing an inlet for each fuel injector fits over the carrier.

The combination of carrier, the injectors, and the cover forms a sub-assembly that is assembled into tube 24 by insertion through one end of the tube.

In use, pressurized liquid fuel is introduced into tube 24 via a suitable inlet (not shown) so that the fuel injectors are essentially completely immersed in fuel.

Connector 76 serves to connect the fuel injectors to the usual engine management computer so that the injectors are operated at the proper times and for the proper durations. The energization of an injector solenoid will open the injector to cause an injection of fuel to be emitted from nozzle 68 through hole 36. Metering of fuel can be performed by a thin orifice disc (not shown) mounted on the injector tip end in covering relation to the outlet of hole 36. The injection terminates with the termination of solenoid energization.

The foregoing description has generally described the fuel injectors and fuel rails shown in the aforementioned commonly assigned U.S. patents. The novel aspects of the improvement provided by the present invention will now be described.

Because nozzle 68 and seal 70 are circular, and are received in a circular hole in the sidewall of tube 24, a potential for turning of the nozzle in the hole about axis 38 may exist if provision is not made to prevent such rotation. The present invention relates to a unique way to eliminate this potential.

In accordance with principles of the invention, stator legs 56, 58 are provided with integral, generally parallel, lengthwise extending keys 80, 82. These keys face each other across the bight of the U-shaped stator and are rectangular in transverse cross section. The open space between the stator legs as measured from the crown of one key to that of the other is less than the nominal O.D. of seat member 32 where legs 56, 58 straddle the seat member. Absent keys 80, 82, the open space between the legs would measure slightly more than the seat member's nominal 0.D.

So that legs 56, 58, including keys 80, 82, can straddle seat member 32, keyways 84, 86 are integrally provided in the O.D. of seat member 32 on diametrically opposite sides, generally at the level of sphere 40. These keyways are shaped for engagement by keys 80, 82. When the keys and keyways are engaged, a corner 88 of each key fits to a corner 90 of each keyway, and the seat member is thereby axially and circumferentially located relative to the stator. This engagement constrains the seat member from turning about axis 38. The fact that both legs 56, 58 may be in physical contact with seat member 32 does not create a shorting of the magnetic circuit path so long as the seat member is a non-ferromagnetic material, like some of the stainless steels.

While a presently preferred embodiment of the invention has been illustrated and described, it should be appreciated that principles are applicable to other embodiments.

What is claimed is:

1. In an electromagnetically operated valve which comprises a valve body, a valve seat member having an axis and being received in a mounting in said body such that said seat member can potentially turn within said mounting about said axis, said valve seat member also comprising a frusto-conical seat as a surface of revolution about said axis, a sphere that is disposed for coaction with said seat to open and close flow through the valve, resilient means acting to resiliently urge said sphere along said axis toward concentrically seating on said seat and thereby closing flow through the valve, and sphere-actuating means, including electromagnetic operating means, for bodily displacing said sphere from concentric seating on said seat comprising a movable bar that is disposed along side said sphere and operated by said electromagnetic operating means to execute motion that is predominantly along the direction of an imaginary line that intersects said axis, said bar executing such motion toward and away from said axis in accordance with a control signal applied to said electromagnetic operating means, such motion of said bar toward said axis creating a force acting on said sphere at the end of a radial of said sphere, which radial, when viewed along said axis, is substantially coincident with said imaginary line, and such force created by such motion of said bar along said imaginary line being effective, in cooperation with said seat and resilient means, to cause said sphere to be bodily displaced from concentricity with said axis to eccentricity with said axis thereby opening flow through the valve, and such motion of said bar away from said axis being effective to allow said resilient means, in cooperation with said seat, to cause said sphere to be restored to concentricity with said axis and thereby close flow through the valve, the improvement in which said sphere-actuating means comprises a stator that in cooperation with said bar forms a magnetic circuit and that has a termination confronting said bar across a gap via which magnetic force is delivered to operate said bar, and in which between said stator and said seat member there is provided means creating an interference causing said stator to constrain said seat member against turning within said mounting about said axis.

2. The improvement set forth in claim 1 in which said means creating an interference causing said stator to constrain said seat member against turning within said mounting about said axis comprises key means and keyway means keyed together.

3. The improvement set forth in claim 2 in which said key means is integral with said stator and said keyway means is integral with said seat member.

4. The improvement set forth in claim 3 in which said stator comprises two generally parallel branches disposed on diametrically opposite sides of said seat member, said seat member comprises a relatively non-ferromagnetic material, said keyway means comprises respective keyways on diametrically opposite sides of said seat member, and said key means comprises respective keys on said branches of said stator in respective keyed engagement with said keyways.

5. The improvement set forth in claim 1 in which said stator comprises two generally parallel branches disposed on diametrically opposite sides of said seat member, said means creating an interference causing said stator to constrain said seat member against turning within said mounting about said axis comprise a key on one of said branches and a keyway on said seat member that is in keyed engagement with said key.

6. In a valve having a valve seat member and an associated valve member that is operated by an electromagnetic operating means to open and close flow through a passage circumscribed by said seat member, the improvement in which said seat member comprises a relatively non-ferromagnetic material and said electromagnetic operating means comprises a stator engaging a sidewall of said seat member, said stator and said seat member comprising key means on one of said seat member and said stator in keyed engagement with keyway means on the other of said seat member and said stator to both axially and circumferentially at least in part locate said seat member relative to said stator.

* * * * *